Aug. 26, 1952     H. LYON     2,607,949

CLUTCH TYPE FRICTION CATCH

Filed March 4, 1946

Inventor
Hyland Lyon
By Lyon & Lyon
Attorneys

Patented Aug. 26, 1952

2,607,949

UNITED STATES PATENT OFFICE 2,607,949

CLUTCH TYPE FRICTION CATCH

Hyland Lyon, Los Angeles, Calif.

Application March 4, 1946, Serial No. 651,758

4 Claims. (Cl. 16—140)

1

This invention relates to a clutch, and more particularly to expansible friction clutches for controlling the relative rotation of two associated elements.

In its simplified form this invention is illustrated as a means of controlling the relative rotation of two elements of a hinge. In this illustration my invention is utilized as an expansible hinge pin for imposing a frictional drag or resistance to the free rotation of the said hinge elements around or with relation to said hinge pin or to each other.

It is therefore an object of this invention to provide a clutch which incorporates a pin or shaft upon which it is positioned or which forms an expansible friction element and upon which frictional element the means for relative rotation are carried and a means for expanding the sleeve or shaft from within to determine the frictional resistance to relative rotation of the elements carried thereby.

Another object of this invention is to provide a clutch including a split sleeve element adapted to be mounted within a journal and within which split sleeve there is positioned a screw means having relatively flat tapered threads which may or may not increase in diameter toward the head of the screw and adapted to be threaded into the sleeve to expand the sleeve within the journal to determine the frictional resistance to rotation of the sleeve and journal.

Other objects and advantages of my invention it is believed will be apparent to those skilled in this art from the hereinafter contained description of my invention as illustrated in the accompanying drawings, in which Figure 1 is a top plan view of a hinge construction incorporating the clutch embodying my invention.

As my invention is illustrated in the accompanying drawings, the clutch is shown as an expansible hinge pin of a hinge. The hinge includes the relatively rotatable hinge members 1 and 2 having overlapping eye sections 3, 3 and 4, 4 through which the hinge pin or clutch element 5 is passed.

Figure 1:
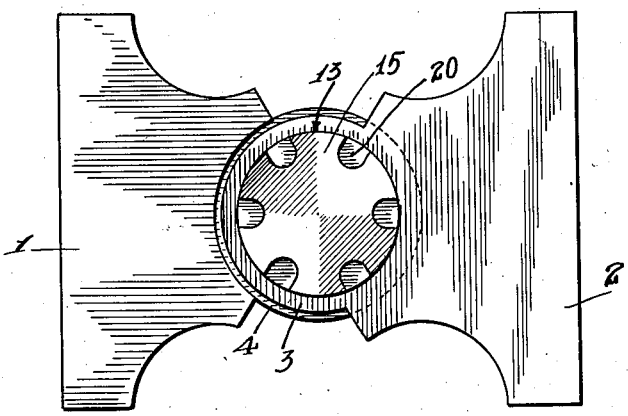
Figure 3:
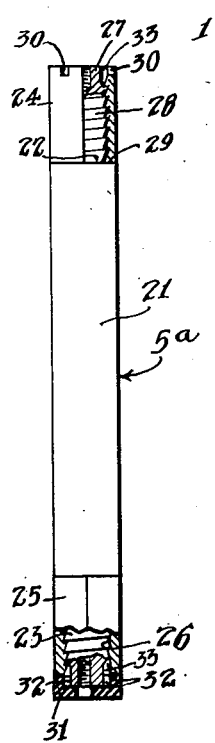
Figure 3 is a detached side elevation partly in half section of a modified form of hinge pin or clutch embodying my invention.
Figure 2:
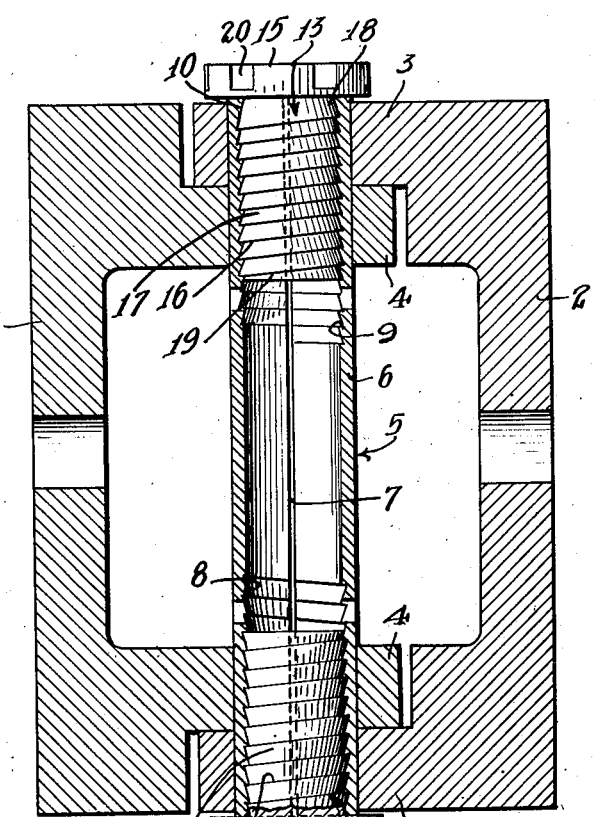
Figure 2 is a side elevation principally in vertical mid-section thereof.

The clutch element 5 may be of the construction illustrated in Figures 1 and 2, or in Figure 3, or any suitable modification thereof, and in the form illustrated in Figures 1 and 2 includes

2 a sleeve 6 which is longitudinally split as indicated at 7. Prior to splitting of the sleeve 6 it is threaded at its opposed ends as indicated at 8 and 9.

The threads are of "sawtooth" profile forming a series of tapered wedging surfaces to give the effect of multiple helical cones. The threads as a whole, however, do not taper, that is, the pitch diameter remains constant. Likewise the pitch itself is constant.

The expansion elements are in the form of screws 12 and 13 having heads 14 and 15 respectively. The threads of the screws 12 and 13 mate with the threads 8 and 9. The threads of the screws 12 and 13 have constant pitch diameter and form helical cone wedging surfaces which conform to and are parallel with the wedging surfaces of the threads 8 and 9.

The expansion elements or screws 12 and 13 form a free running fit with the mating threads 8 and 9 until the heads 14 and 15 bear against the extremities of the sleeve whereupon axial movement between the screws 12 and 13 and the sleeve 6 is prevented. On further forced relative rotation between the screws 12 and 13 and the sleeve 6, the helical-conical wedging surfaces of the threads 8 and 9 ride up over the mating wedging surfaces of the screws 12 and 13 causing the two series of wedging surfaces to assume different positions axially of one another, and thereby to cause radial expansion of the sleeve 6. It will be observed that the slope of the wedging or helical-conical surfaces is relatively gradual, so that a large radial or expanding force may be exerted. Furthermore, it will be observed that relative axial displacement of the wedging surfaces causes the sleeve to expand uniformly throughout its length.

In order to adjust the position of the screws 12 and 13 their heads 14 and 15 are provided with suitable sockets 20 to receive a wrench.

In the modified form of my invention illustrated in Figure 3, the clutch member 5ª is illustrated as being formed of a solid pin 21 having reduced end sections 22 and 23 upon which the split sleeves 24 and 25 are positioned. The short sleeve sections 24 and 25 are split longitudinally and are of substantially the same external diameter as the pin 21. This permits the pin to be slipped through the complementary eyes 3 and 4 of a hinge structure. The split sleeves 24 and 25 are internally threaded as indicated at 26 with threads of sawtooth profile to form helical-conical wedging surfaces as in the first described structure.

The reduced sections 22 and 23 of the pin 21 are provided with complementary threads 28. A shoulder 29 is formed at the root ends of the reduced sections 22 and 23. These shoulders are engaged by the sleeves 24 and 25 so as to prevent axial movement between the reduced sections 22 and 23 of the pin and the sleeves 24 and 25 and on further forced relative rotation of said sleeves and said reduced sections to cause the necessary relative axial displacement of the wedging surfaces formed by the threads 26 and 28 in the manner of the first described structure. The expansion of the sleeves in diameter within the journals provided by the eyes 3 and 4 increases the frictional resistance to relative rotation of the hinge elements around the hinge pin. The sleeves 24 and 25 are provided with wrench sockets 30 at their outer ends 27 into which a suitable socket wrench may be fitted, and a lock washer 31 having suitable projections 32 is provided which fits within the wrench sockets 30 of the sleeves 24 and 25 and into corresponding wrench sockets 33 formed in the ends of the pin sections 22 and 23, respectively, to lock the sleeves in their adjusted positions.

Having fully described my invention, it is evident that the clutch of my invention is not limited to use as a hinge pin but is of wide and extended applicability where a quickly adjusted, finely controlled clutch or gripping means is desired.

I claim:

1. A clutch involving: a split sleeve adapted to fit within a journal; a pin adapted to fit within said sleeve; mating screwthread elements in the confronting surfaces of said sleeve and pin, said screwthread elements having a profile defining a series of wedging surfaces interrupted by shoulders, said screwthread elements having constant pitch and pitch diameter and so related as to provide normally a running fit between said sleeve and pin; said pin and sleeve having coacting abutments adapted upon engagement to prevent axial movement between said pin and sleeve and adapted upon forced relative rotation of said pin and sleeve to cause one of said series of wedging surfaces to ride up over said other series of wedging surfaces whereby the two series of wedging surfaces of said screw thread elements assume different positions axially of one another thereby to effect uniform expansion of said sleeve in said journal.

2. A clutch including: a stem having a reduced portion; a split sleeve fitting over said reduced portion; screwthread elements in the confronting surfaces of said reduced portion and sleeve, said screwthread elements having a profile defining a series of wedge surfaces interrupted by shoulders, said screwthread elements having constant pitch diameter and being so related as to provide a running fit between said reduced portion and said sleeve; said stem forming an abutment engageable by said sleeve whereby on engagement axial movement between said reduced portion and said sleeve is prevented and on forced relative rotation of said reduced portion and said sleeve one of said series of wedge surfaces is caused to ride up over said other series of wedge surfaces whereby the two series of wedge surfaces of said screw thread elements assume different positions axially of one another thereby to expand said sleeve.

3. A clutch including: a stem having a reduced portion; a split sleeve fitting over said reduced portion; screwthread elements in the confronting surfaces of said reduced portion and sleeve, said screwthread elements having a profile defining a series of wedge surfaces interrupted by shoulders, said screw thread elements having constant pitch diameter and being so related as to provide a running fit between said reduced portion and said sleeve; said stem forming an abutment engageable by said sleeve whereby on engagement axial movement between said reduced portion and said sleeve is prevented and on forced relative rotation of said reduced portion and said sleeve one of said series of wedge surfaces is caused to ride up over said other series of wedge surfaces whereby the two series of wedge surfaces of said screw thread elements assume different positions axially of one another thereby to expand said sleeve; said stem and said sleeve having in their extremities a series of notches; and a locking member having lugs adapted to fit in said notches to secure said sleeve in various positions relative to said stem.

4. In a device of the class described: a split sleeve; a headed pin fitting each end of said sleeve; said pins and the extremities of said sleeve having mating helical-conical wedging surfaces defining a sawtooth profile and permitting a running fit between said pins and sleeve; the heads of said pins adapted to abut the extremities of said sleeve to prevent axial movement between said sleeve and said pins and on forced relative rotation of said sleeve and pins to cause one of said helical-conical wedging surfaces to ride up over said other helical-conical wedging surface whereby the two helical-conical wedging surfaces assume differing positions axially of one another thereby to expand said sleeve.

HYLAND LYON.

REFERENCES CITED

The following references are of record in the file of this patent:

UNITED STATES PATENTS

| Number | Name | Date |
| --- | --- | --- |
| 197,473 | James | Nov. 27, 1877 |
| 277,408 | Carleton | May 8, 1883 |
| 763,220 | Totten | June 21, 1904 |
| 1,193,636 | Van Antwerp | Aug. 8, 1916 |
| 1,611,942 | Persons | Dec. 28, 1926 |
| 1,847,937 | Fetters | Mar. 1, 1932 |

FOREIGN PATENTS

| Number | Country | Date |
| --- | --- | --- |
| 534,347 | France | Jan. 4, 1922 |